(12) United States Patent
Schoop et al.

(10) Patent No.: US 6,671,569 B1
(45) Date of Patent: Dec. 30, 2003

(54) METHOD FOR MONITORING A WORKPIECE DURING A TRANSPORTATION AND/OR PRODUCTION PROCESS

(75) Inventors: Ronald Schoop, Hainburg (DE); Siegfried Ralf Neubert, Aschaffenburg (DE); Eckart I. Tietze, Seligeustadt (DE)

(73) Assignee: Schneider Automation GmbH, Seligenstadt (DE)

( * ) Notice: Subject to any disclaimer, the term of this patent is extended or adjusted under 35 U.S.C. 154(b) by 0 days.

(21) Appl. No.: 09/625,412

(22) Filed: Jul. 25, 2000

(30) Foreign Application Priority Data

Jul. 28, 1999 (DE) .......................................... 199 35 320

(51) Int. Cl.[7] .......................... G05B 11/01; G06F 19/00; G06F 7/00
(52) U.S. Cl. .......................... 700/112; 700/19; 700/115; 700/169; 700/226
(58) Field of Search .......................... 700/99, 100, 112, 700/115, 116, 225, 226, 169, 180, 19

(56) References Cited

U.S. PATENT DOCUMENTS

| | | | | |
|---|---|---|---|---|
| 5,828,989 A | * | 10/1998 | Zvonar et al. | 702/188 |
| 5,980,591 A | * | 11/1999 | Akimoto et al. | 29/25.01 |
| 6,000,830 A | * | 12/1999 | Asano et al. | 700/121 |
| 6,236,903 B1 | * | 5/2001 | Kim et al. | 700/121 |
| 6,275,743 B1 | * | 8/2001 | Kondo et al. | 700/214 |
| 6,360,133 B1 | * | 3/2002 | Campbell et al. | 700/115 |
| 6,400,999 B1 | * | 6/2002 | Kashiyama et al. | 700/100 |

FOREIGN PATENT DOCUMENTS

EP 0654721 5/1995

OTHER PUBLICATIONS

Wada, Hidehiko et al., *A Machinery Control System Using Mobile Agents*.
Zipper, B. et al., *Objektnahe Datenhaltung im Fertigungsbereich*, ZwF 88 (1993), 1, pp. 20–23.
Gausemeier, J. et al., *Dezentral automatisiertes Materialflußsystem*, ZwF 93 (1998), 9, pp. 411–414.
Batz, T. et al., *Objektorientierte Modellierung von Produktionsprozessen*, Informatik Forschung und Entwicklung 1995, pp. 26–40.

* cited by examiner

Primary Examiner—Leo Picard
Assistant Examiner—Ryan Jarrett
(74) Attorney, Agent, or Firm—Dennison, Schultz & Dougherty

(57) ABSTRACT

The invention relates to a method for monitoring a workpiece (WSx) during a transportation and/or production process with at least one workpiece agent (WA1 . . . WAn) assigned to the workpiece. To enhance the freedom of the process from failure on the one hand and to facilitate the incorporation of new workpieces into the process on the other, it is provided that the failure of a workpiece agent (WA1 . . . WAn) assigned to a workpiece (WSx) is detected; that the monitoring of the workpiece (WSx) is taken over by a further workpiece agent (WAk), and workpiece-specific data of the taken-over workpiece (WSx) are contained in the workpiece agent (WAk) taking over the monitoring and/or in a database and are transmitted in the workpiece agents.

6 Claims, 5 Drawing Sheets

METHOD FOR MONITORING A WORKPIECE DURING A TRANSPORTATION AND/OR PRODUCTION PROCESS

FIELD OF INVENTION

The invention relates to a method for monitoring a workpiece during a transportation and/or production process with at least one workpiece agent assigned to the workpiece.

BACKGROUND OF THE INVENTION

From the prior art, methods are known by which a fixed association between workpiece agent and workpiece is provided. If one workpiece agent fails, the workpiece flow goes out of control, so that the workpiece must be removed from the transportation and/or production operation. A fixed association between workpiece agent and workpiece also hinders the new incorporation of unknown workpieces into the transportation and/or production process. In the prior art, that always requires defining a new workpiece agent.

SUMMARY OF THE INVENTION

The object of the present invention is to refine a method of the type defined above such that on the one hand the freedom from failure of the transportation and/or production process is increased and on the other hand the incorporation of new workpieces into the transportation and/or production process is facilitated.

This object is attained according to the invention, among other provisions, in that the failure of a workpiece agent assigned to a workpiece is detected; that the monitoring of the workpiece is taken over by a further workpiece agent, and workpiece-specific data of the taken-over workpiece are contained in the workpiece agent taking over the monitoring and/or in a database and are transmitted in the workpiece agents.

In contrast to the prior art, no fixed association is made between workpiece agent and workpiece. If one workpiece agent fails, the monitoring of the workpiece can be taken over by a further workpiece agent, without impeding the transportation and/or production process as a result. In particular, the freedom of the entire production system from failure is improved.

In a preferred method procedure, it is provided that a plurality of workpieces are monitored by one workpiece agent, and workpiece-specific data are stored in the applicable workpiece agent; that the failure of the workpiece agent is detected by a transportation agent, which independently selects a functionally ready further workpiece agent for monitoring the workpiece; and that the further workpiece agent checks whether workpiece-specific data of the workpiece to be monitored are stored in memory, and if workpiece-specific data are absent, a connection with a database and/or a data carrier is made, in order to read the workpiece-specific data stored therein.

In the normal case, the workpiece is handled by one workpiece agent during the entire transportation or production process. This workpiece agent communicates with a transportation agent, in order to establish an optimal transportation route to a desired destination. If the communication between workpiece agent and transportation agent is disrupted, for instance by failure of the workpiece agent or of the communication connection, then the transportation agent independently assumes contact with a further workpiece agent, so that the latter will take over the monitoring of the workpiece to be machined in the ensuing process.

In an especially preferred method procedure, it is provided that the workpiece agent that takes over the monitoring communicates with a database, in order to obtain workpiece-specific data that are necessary for the further machining steps of the workpiece. Alternatively, it can be provided that the workpiece-specific data are contained in a data carrier, such as a memory block or magnet code, that is assigned to the workpiece, that is, either is connected directly to the workpiece or is provided on a workpiece carrier that carries the workpiece.

Preferably, the transportation agent selects a workpiece agent by the principle of randomness.

In a method procedure of independent inventive character, a workpiece newly introduced into the transportation and/or production process is preferably grasped and recorded by a transportation agent, and that the transportation agent selects a workpiece agent that is intended to take over the monitoring of the workpiece, and that the workpiece agent takes the workpiece-specific data corresponding to the new workpiece from a database and/or receives the workpiece-specific data from a data carrier coupled to the workpiece.

By this provision, the transportation and/or production process becomes quite flexible, since arbitrary workpieces can be incorporated into the process without requiring a complicated reconfiguration of the entire system.

According to the invention, each workpiece agent is constructed such that it has a control unit, which controls a plurality of units such as a transportation agent thread, workpiece agent thread and machine agent thread; a "thread" is understood as the smallest processing unit of an applications program or operating system. To enable simple reconfiguration of the process, the agents communicate with one another and initialize themselves.

The agents are preferably implemented as hardware and/or software blocks in a memory-programmable controller. For communication with other PC-based units, a DECOM interface is provided.

Further details, advantages and characteristics of the invention will become not only from the claims and the characteristics drawn from them—taken alone and/or in combination—but also from the ensuing description of a preferred exemplary embodiment shown in the drawing.

DETAILED DESCRIPTION OF A PREFERRED EMBODIMENT

Figure 1:
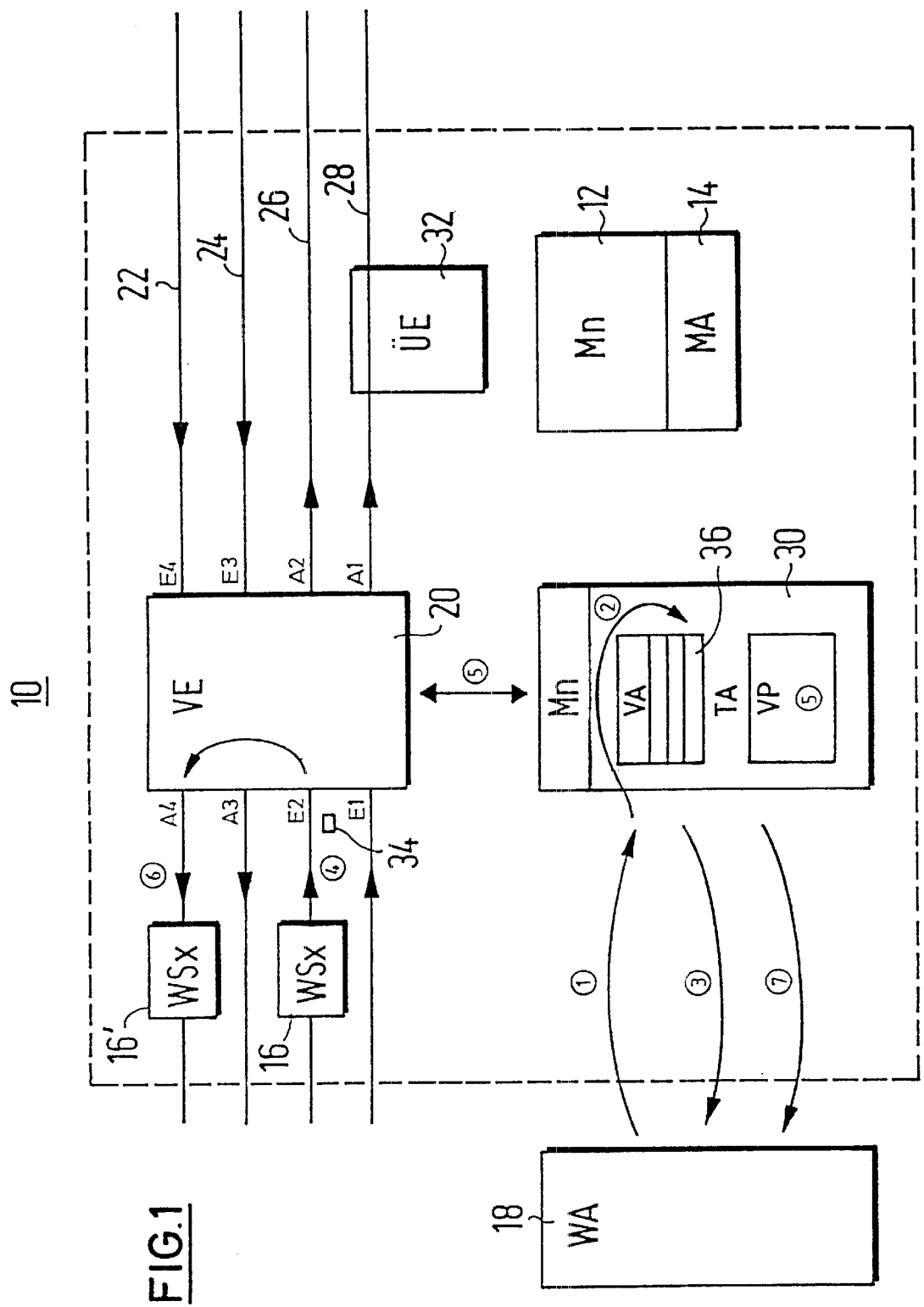
FIG. 1, a detail from a production system shown schematically.

FIG. 1 schematically shows a detail of a production system 10. The production system 10 includes machines 12, machine agents 14 assigned to the machines, workpieces 16, 16', workpiece agents 18 assigned to the workpieces, and transportation means 20, 22, 24, 26, 28 for transporting the workpieces 16, 16' between the machines 12. Transportation agents 30 are assigned to the transportation means.

The transportation means 20 is embodied as a displacement unit, in particular a displacement table, turntable or rotational element, such as a revolving drum, for enabling the workpieces 16, 16' to make the change between the further transportation means 22, 28 embodied as transportation paths. The transportation paths 22–28 are embodied as roller paths, and the transportation paths 26, 28 are disposed on the edge and are driven in the production direction, while the transportation paths 22, 24 are driven opposite the production direction and thus opposite the travel direction of the transportation paths 26, 28. A transfer device 32 is also provided, which connects the machines 12 to the transportation path 28, for instance.

The workpiece 16, 16' is handled during an entire production process by the workpiece agent 18. As soon as the workpiece 16, 16' is shunted into the production system 10, an identification of the workpiece is made via a sensor system, not shown in further detail, and stored in memory in the workpiece agent 18. For a particular type of workpiece, such as a 4- or 6-cylinder engine block, various machining processes are to be performed, which the workpiece agent 18 recognizes from the identification. In the further course of production, the workpiece agent assures that all the required machining processes are made on the workpiece. In particular, the workpiece agent checks the availability of processing machines 12, ascertains which processing machine is most favorable, and brings about transportation to that machine.

As soon as the workpiece 16 is being handled by the workpiece agent 18, the latter communicates with the machine agent 14, assigned to the machines 12, which informs the workpiece agent of the state of machining at the time. Next, from the options offered, the workpiece agent 18 selects the most favorable machine 12, taking into account the fill level at the time of each of the machines involved.

The displacement unit 20 is handled by the transportation agent 30. The transportation agent is capable of independently controlling the displacement unit 20. If the workpiece 16 is being transported over the conveyor belt 26 in the production direction to the displacement unit 20, the workpiece is stopped at an entrance E2 and detected by a sensor 34.

In a first method step V1, the workpiece agent 18 orders the transportation agent 30 to transport the workpiece 16 to a desired destination machine address. In this respect it should be noted that according to the invention, each transportation agent 30 is assigned a certain machine address Mn. All the other machines 12 are assigned either increasing machine addresses M(n+x) or decreasing machine addresses M(n−x). This means that each machine 12 with a certain machine address Mn, together with the associated transportation agent 30 and the displacement unit 20, forms a local unit.

In a second method step V2, the transportation order is stored in memory in a job list 36 and is worked through in the order of the job entries. Next, the transportation agent 30 acknowledges the transportation job and sends an acknowledgement signal back to the workpiece agent 18 (method step V3). In a method step V4, the transportation agent 30 autonomously decides on a certain destination exit to which the workpiece 16, present at the entrance E2, is to be displaced so as to reach the destination machine address Mz over an optimal route. The desired destination machine address Mz is compared with the local machine address Mn of the transportation agent 30, and the desired destination exit is determined as a function of the comparison. If the destination machine address Mz corresponds to the local machine address Mn, then the workpiece 16' is transported to the exit A1 and travels over the conveyor belt 28 to the transfer unit 32 and can be shunted out to the destination machine address Mz=Mn. If the destination machine address Mz is less than the local machine address Mn, that is, if Mz =M(n−x), then the workpiece 16' is transported counter to the production direction, that is, is displaced to one of the exits A3 or A4. If the desired destination machine address Mz should be greater than the local machine address Mn, that is, if Mz=M(n+x), then the workpiece 16' is displaced in the production direction, that is, to the exits A1 or A2. All the machines of the production system 10 is disposed in increasing order of machine address Mn, and the machine address Mn increases in the production direction.

Once the transportation agent 30 has defined a destination exit, a displacement program implemented in the transportation agent is started (method step V5), so that the displacement job can be performed.

The workpiece 16' is shunted to the desired destination exit (A4 in the exemplary embodiment shown) and transported opposite the production direction over the transportation path 22 (method step V6).

The method according to the invention is distinguished in particular in that the production system 10 is easily modified, since such local changes as removing and adding machines have to be configured only locally.

If the machine 12 having the machine address Mn fails, for instance, only the transportation agent 30 has to be reconfigured. The workpiece agents handling the workpieces 16 are unaffected by the reconfiguration, because they know only the associated destination machine addresses Mz of the workpieces they handle. There is accordingly no need for the global topography of the production system 10 to be stored in memory in each workpiece agent. Nor is it necessary for the transportation agent to know all the machine addresses; this is because the transportation agents 30 can also decide for themselves which machine address M(n+x) or M(n−x) is optimal for whatever machining step is desired at the time.

Figure 2:
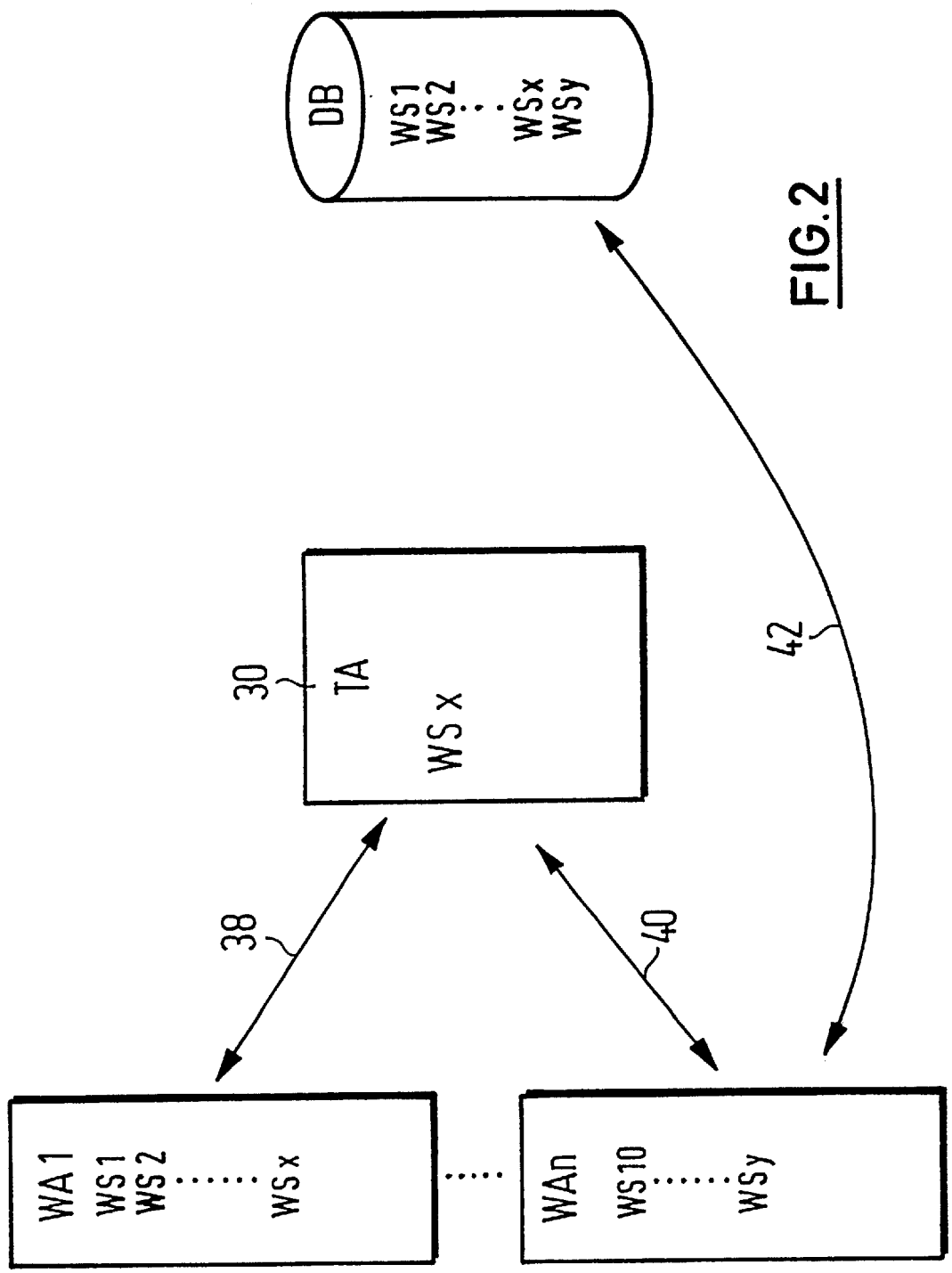
FIG. 2, a schematic method sequence when a workpiece agent fails.

FIG. 2 purely schematically shows a method sequence in the event of failure of a workpiece agent, as an advantageous refinement of the production system 10 of FIG. 1. According to the invention, a plurality of workpiece agents WA 1 . . . WAn are provided, which communicate with the transportation agent or agents 30.

No fixed association is made between the workpiece agents and the workpieces to be monitored; instead, a plurality of workpieces WS 1 . . . WSx or WS 10 . . . WSy are assigned to each of the workpiece agents WA 1 . . . WAn. For instance, the workpiece agent WA 1, over a communication connection 38, gives the transportation agent 30 the order to displace the workpiece WSx.

If data communication is defective, either from a line break or a failure of the workpiece agent WA 1, the workpiece WSx in the method of the prior art would not have any further control or handling function. According to the invention, it is therefore provided that the transportation agent 30 assumes a communication connection 40 with one of the further workpiece agents WA 2 . . . WAn. This take up of contact and selection are preferably done by the randomness principle. The workpiece agent selected checks whether the workpiecespecific data of the workpiece WSx are contained in the memory unit of this workpiece. For instance, if the workpiece agent WAn is selected and ascertains that the workpiece agent WAn contains no workpiece-specific data WSx, then by a further communication connection 42 a connection is made between the workpiece agent WAn and a workpiece database DB in which all the workpiece-specific data are stored in memory.

Finally, the data pertaining to the workpiece WSx are stored in memory in the workpiece agent WAn, so that this workpiece agent is responsible for the remaining machining time of the workpiece WSx. The workpiece agent WA 1 is taken out of service with regard to the workpiece WSx.

This method procedure is distinguished in that failures of workpiece agents WA 1 . . . WAn are reliably intercepted. In particular, the failure of one workpiece agent has no influence on the overall performance of the production system 10.

Figure 3:
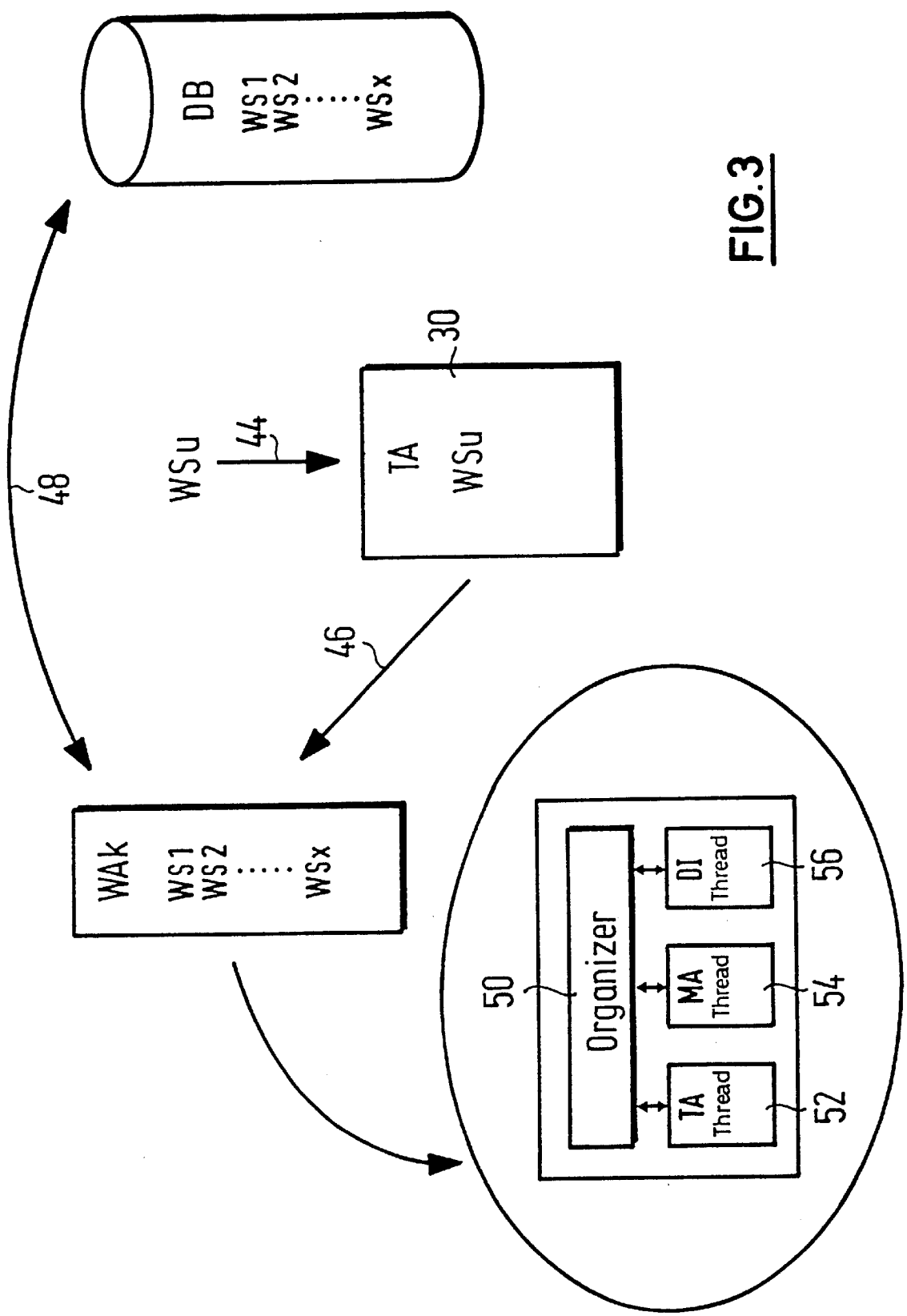
FIG. 3, a schematic method sequence when an unknown workpiece is incorporated.
Figure 4:
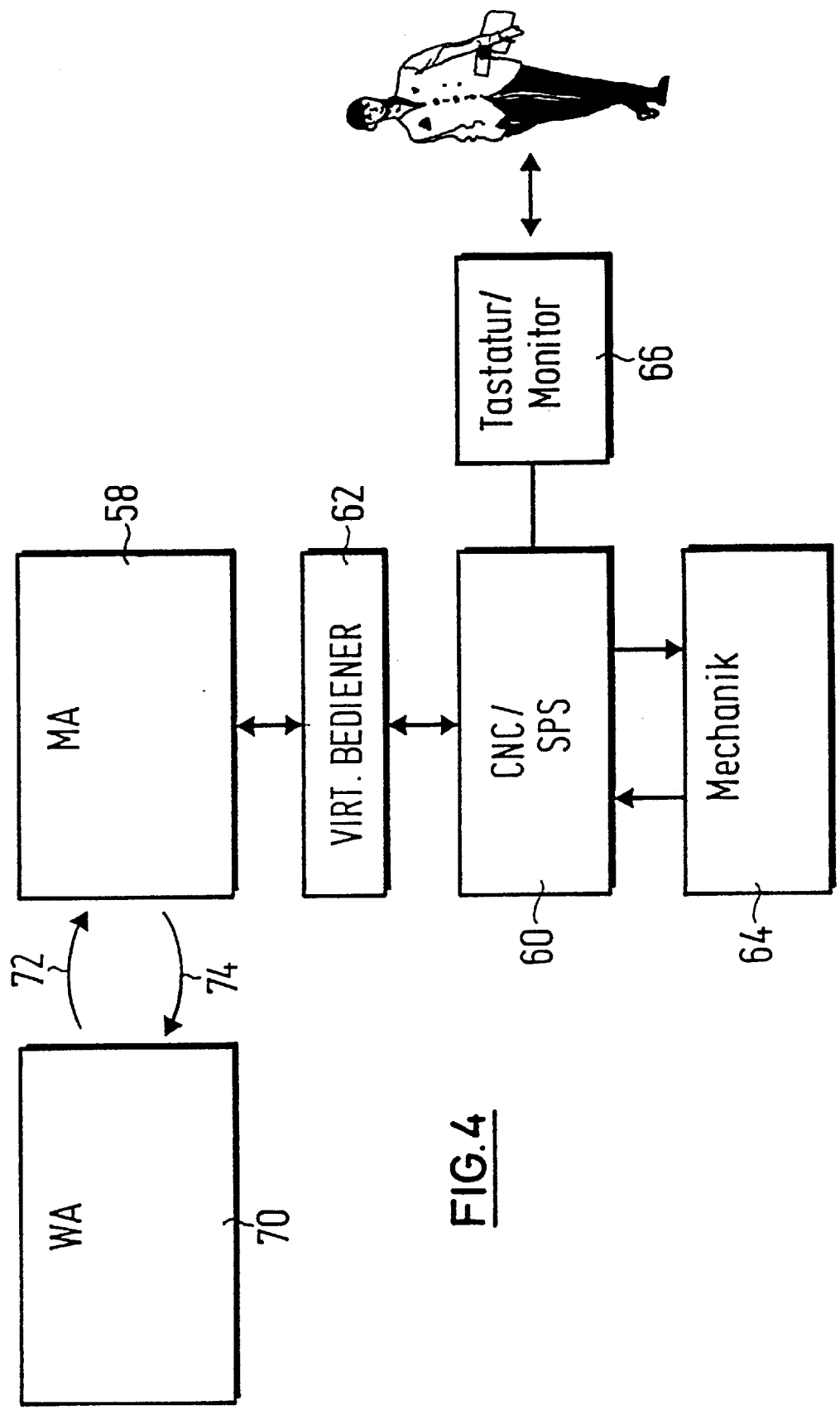
FIG. 4, a schematic illustration of an interface between a machine agent and a memory-programmable controller for a processing machine.

FIG. 3 shows a schematic method sequence upon the incorporation of new workpiece WSu, that is, a workpiece previously unknown to the system 10. First, the unknown workpiece WSu is detected by a sensor system and recorded in the transportation agent 30 via a communication connection 44. The transportation agent 30 ascertains that the workpiece WSu is unknown, whereupon by the randomness principle, via the communication connection 46, one workpiece agent WAk is selected from the existing workpiece agents WA 1 . . . WAn. The workpiece agent WAk, via the connection 48, assumes contact with the database DB and withdraws the data specific to the workpiece WSu, if such data are contained in the database DB. If not, the possibility also exists that the workpiece WSu, or a workpiece carrier carrying the workpiece, already contains the workpiece-specific data. In that case, via the connection 48, the workpiece agent WAk would deposit a data set in the database DB for the workpiece WSu.

This method procedure according to the invention makes it possible to incorporate unknown workpieces, thus increasing the flexibility of the production system 10.

The workpiece agents WA 1 . . . WAn are constructed such that a control unit 50 controls the function of a plurality of what are known as "threads"; each external agent, such as a transportation agent TA, machine agent MA, or the database DB, is assigned one thread 52, 54, 56. Furthermore, the agents WA, TA and MA communicate with one another and initialize themselves mutually. The reconfiguration is simplified as a result.

A further invention of independent inventive character pertains to an interface 62 disposed between a machine agent 58 and a machine controller 60. The machine controller 60 is connected to the mechanics of the machine 64 via an input/output interface. The machine controller 60 also includes an input unit 66, comprising a monitor and a keyboard, by way of which the machine controller 60 can be operated manually by an operator 68.

Originating at a workpiece agent 70, inquiries or jobs are sent to the machine agent 58 via a communication connection 72. Next, the machine agent 58, via a communication connection 74, transmits a list of options back to the workpiece agent 70. The jobs or inquiries received are converted by the interface 62 into commands that are transmitted to the machine controller 60, so that the desired machining steps will be performed on the workpiece. It is provided that the interface 62 is implemented in the form of a virtual simulation of the operator interface 66. By the interface 62, the advantage is attained that the machine agent 58 can cooperate with every machine or every machine controller 60, since the interface 62 reacts in the same way to all the machine agents. Since the interface 62, similarly to the input unit 66, is constructed for a human operator 68, the expense for the interface 62 is low. The interface 62 can be implemented as a software block in a memory-programmable controller or in a personal computer.

The described method procedures according to the invention make for highly flexible automation of production. In particular, prototypes and samples can be produced directly on a final system, since the items to be processed are newly defined for each production. Furthermore, the entire system can be adapted to different items within minimal time. In particular, it is possible both to construct noncentral databases and to automate diagnosis. Startup times can also be reduced drastically. The same is true for changes among operating modes.

As already mentioned, the failure of one machine has only insignificant influence on productivity, since all the other machines can continue to operate unimpeded. During a bidding phase, the workpiece agents WA 1 . . . WAn ask the machine agents MA which items can be machined. Defective machines do not present themselves for machining, and thus their work is taken over by other machines that are ready for operation.

The constant detection of actual production data makes it possible to optimize the range of options and to make better utilization of the processing machines, thus enhancing both the economy and re-usability of setups.

Last but not least, new machines can be added without reconfiguration, and existing machines can be removed.

By the method of the invention, the workpiece throughput in the production system 10 can be increased by 50–80%. Partial failures of machines can also be tolerated because of alternative routes. The production system 10 becomes flexible overall and is distinguished by low setup costs and low vulnerability to congestion.

Figure 5:
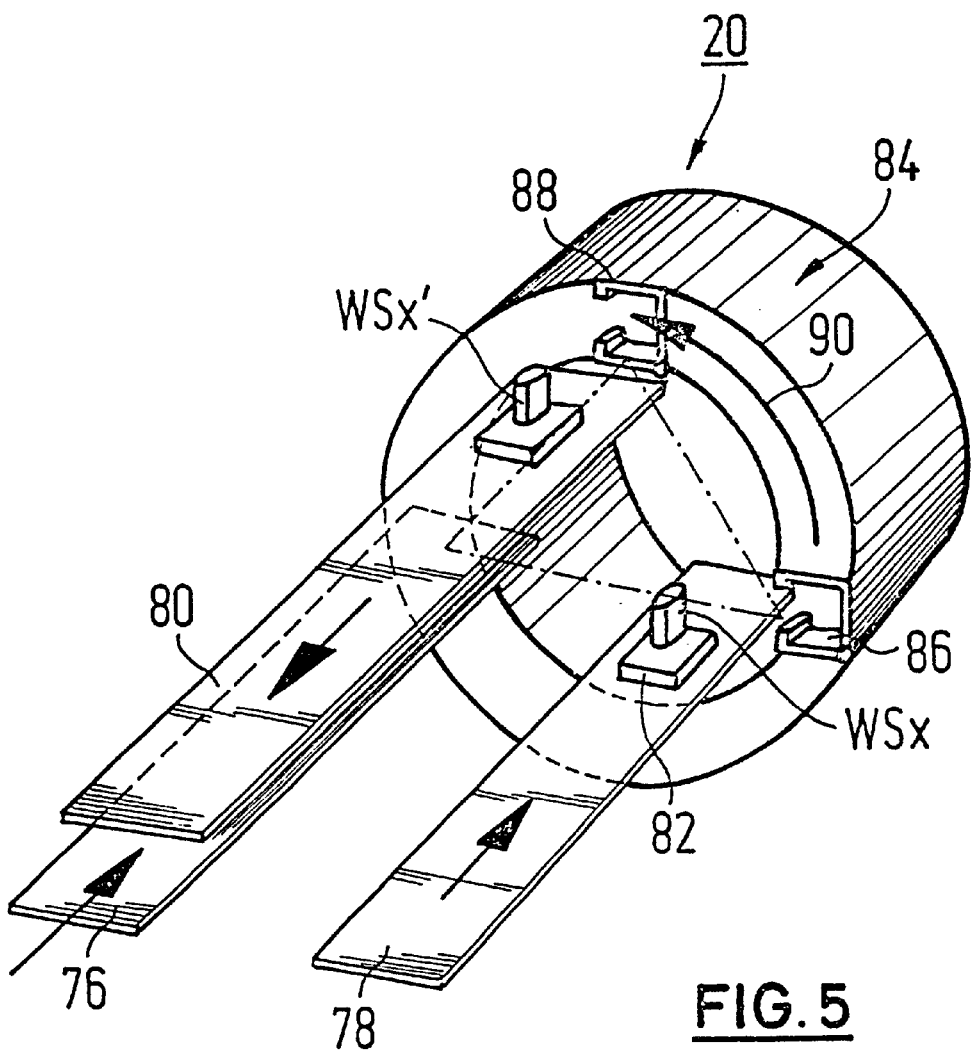
FIG. 5, an apparatus for shifting workpieces among various transportation paths.

FIG. 5 purely schematically shows one possible embodiment of the displacement unit 20. In the exemplary embodiment shown, two conveyor belts 76, 78 are provided, which transport workpieces in the production direction, as well as one conveyor belt 80 that transports workpieces in the opposite direction from the production direction. To achieve a compact structure, the conveyor belts are disposed one above the other in different planes. In the exemplary embodiment, the center axes of the conveyor belts form an equilateral triangle. It is understood that still more conveyor belts can be disposed one above the other, with two conveyor belts running in the production direction in a lower plane and two conveyor belts running in the opposite direction from the production direction in a plane above them. The workpieces WSx are deposited on workpiece carriers 82, which rest on the conveyor belts 76, 78, 80. The displacement unit 20 comprises a mount 84, which encloses the conveyor belts circumferentially and on which receiving devices 86, 88 that can receive or grasp a workpiece WSx, with or without workpiece carriers 82, are disposed on the circumference. By rotation of the preferably drum-like mount 84 in the direction of the arrow 90, the workpiece WSx is rotated by an angle α to the desired conveyor belt and can then be set down on the conveyor belt 80.

Accordingly, the workpiece WSx' can be shifted by a further rotation from the conveyor belt 80 onto the conveyor belt 76. The receiving devices 86, 88 are disposed such that upon rotation of the mount 84, the workpiece maintains its location relative to the horizontal. In particular, the receiving devices 86, 88 can be embodied as gripper devices or roller paths.

We claim:

1. A method for monitoring a workpiece (WSx) during a transportation and/or manufacturing process, comprising the steps of:

introducing a workpiece into the transportation and/or production process, identifying the workpiece by a transportation agent, assigning the workpiece to at least one workpiece agent, monitoring the function of the workpiece agent by the transportation agent;

detecting the failure of a workpiece agent assigned to the workpiece, monitoring of the workpiece that is taken over by a further workpiece agent, and work-piece specific data of the taken-over workpiece are contained in the workpiece agent taking over the monitoring and/or in a database and are transmitted in the workpiece agents, a workpiece (WSx) newly introduced into the transportation and/or production process is grasped and recorded by a transportation agent (TA);

the transportation agent selecting a workpiece agent that is intended to take over the monitoring of the workpiece, the workpiece agent taking the workpiece-specific data corresponding to the new workpiece from a database and/or receiving the workpiece-specific data from a data carrier coupled to the workpiece, storing work-specific data in the applicable workpiece agent, detecting a failure of the workpiece agent by a transportation agent, the workpiece agent checking whether workpiece specific data of the workpiece to be monitored are stored in memory, and a connection with a database and/or data carrier is made in order to read the workpiece specific data stored if workpiece specific data are absent in the memory.

2. The method of claim 1, characterized in that the workpiece agents (WA1 . . . Wan) are selected on the principle of randomness.

3. The method of claim 1, characterized in that each workpiece agent (WA1 . . . Wan) contains the smallest processing units (threads) of an applications program or operating system, the processing units are each assigned to one transportation agent, one machine agent, or one database agent and are controlled by a higher-ranking control unit.

4. The method of claim 1, characterized in that the agents are implemented in the form of hardware blocks and/or software blocks in a memory-programmable controller (SPS-based agents) and/or as a PC program (PC-based agents).

5. The method of claim 4, characterized in that PC-based agents communicate with one another via DECOM interfaces.

6. The method of claim 4, characterized in that SPS-based agents communicate with one another via a hardware-specific protocol.

* * * * *